July 25, 1967 — F. L. WILLIAMS — 3,332,462
ATTACHMENT FOR A PORTABLE ROUTER
Filed April 30, 1965
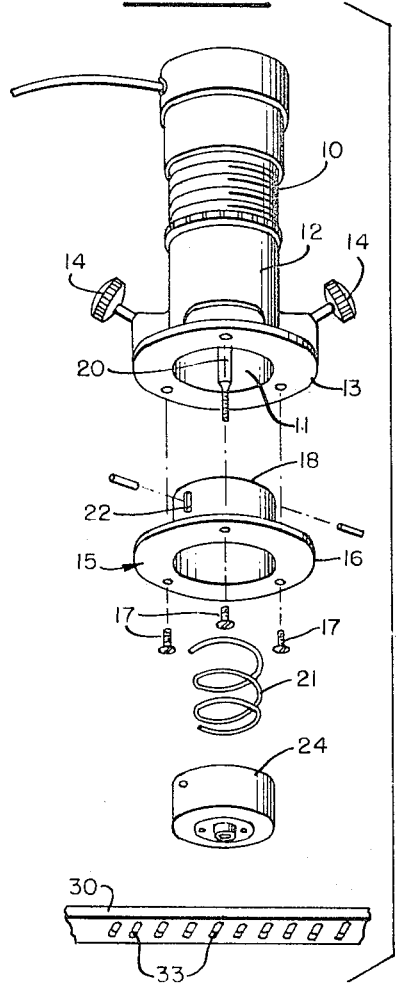
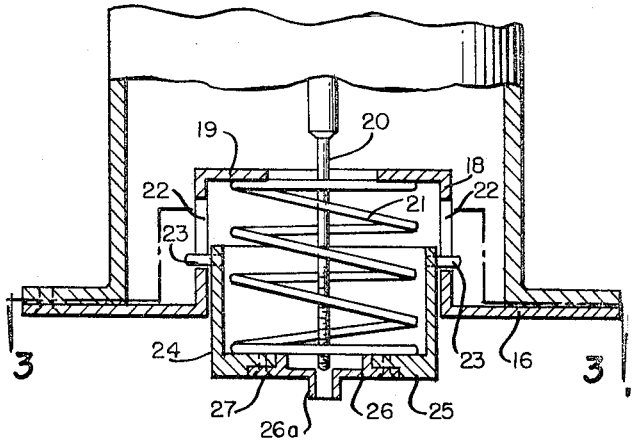
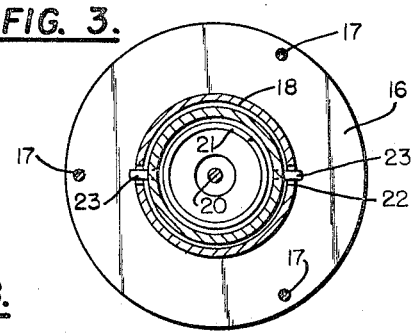
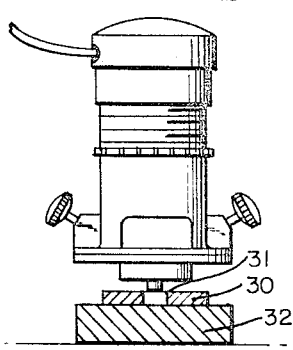
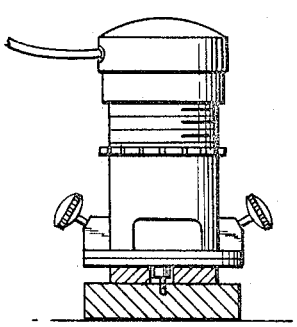
INVENTOR
Fred. L. Williams
BY Hall, Pollack & Vande Sande
ATTORNEYS

United States Patent Office 3,332,462
Patented July 25, 1967

3,332,462
ATTACHMENT FOR A PORTABLE ROUTER
Fred L. Williams, c/o Western Kentucky Cabinet Works, Russellville Road, P.O. Box 984, Bowling Green, Ky. 42101
Filed Apr. 30, 1965, Ser. No. 452,229
4 Claims. (Cl. 144—251)

This invention relates to an attachment for a powered, portable router, and more particularly to an attachment which protects both the bit and template when the router is used for template routing.

In doing template routing, it is customary to use an overhead router and to affix the template to the bottom side of the piece being routed. In such an arrangement, the routing tool is fixed in position in the quill and a guide pin is provided which protrudes from the surface of the work table in axial alignment with the quill. The guide pin protrudes only a slight distance above the surface of the work table and is thus adapted to engage the pattern cut into the template. The piece being routed, with the template affixed to the bottom thereof, is then moved as required with the guide pin at all times fitting in the pattern cut in the template so that the desired pattern is cut into the top surface of the work by the routing tool.

The arrangement just described has distinct disadvantages. One of these is that in the positioning of the template on the underside of the work the pattern is not exposed to view with the result that the operator cannot view the pattern being cut. An even more important limitation is that the size of the template or of the stock material being routed must be limited by the size of the throat of the router.

These disadvantages are entirely overcome by use of a portable router fitted with the attachment of the present invention which permits the template to be placed on the top side of the work being routed. This means that the template is always in view and also that there are no limitations on the size of the work or size of the template. As is well known to those skilled in the art, it has heretofore been impractical to use a portable router for template routing because of the ever-present danger of having the routing tool come in contact with the template. In other words, where the template and the routing tool are both disposed on the same side of the piece being routed, the problem has been that there is always a likelihood that the routing tool might come in contact with the template itself as the routing tool is moved into, or retracted from, the position in which it is in cutting engagement with the material being routed. Since it is the general practice to employ a template which is formed of metal, it is readily apparent that even momentary engagement of the cutting surfaces of the routing tool with the template itself would damage both the routing tool and the template.

It is, accordingly, an object of the present invention to provide an attachment for a portable router which permits use of such router in template routing, particularly where the template is on the same side of the piece being routed as is the routing tool itself.

It is another object of this invention to provide an attachment for a portable router which ordinarily protects and shields the cutting surfaces of the routing tool and also provides such shielding and protection as the routing tool is inserted into or removed from the template, while at the same time automatically providing for engagement of the routing tool with the material being routed once the routing tool has been fully inserted into the pattern of the template.

Other distinguishing characteristics and features of this invention will in part be obvious from the accompanying drawing and will in part become apparent as the description of the invention progresses.

Described briefly, the invention comprises an element which is adapted to be secured, by means of screws or the like, to the base plate of the router, and such element in part forms a hollow cylinder which extends into the interior of the open end of the router and is adapted to receive a piston which is axially movable within the cylinder. The piston is normally urged by means of a spring to extend outwardly and therefore project well beyond the surface of the base plate, with the result that a guide collar carried by the piston is so positioned relative to the cutting tool that it fully protects the cutting surfaces thereof from any possible engagement with either the work to be routed or the template affixed to the top surface of the work. When the router is placed on the top of the template and the guide collar then inserted into the pattern in the template, pressure upon the router as a whole tending to press the router toward the surface of the template causes the piston member to be retracted into the cup-shaped member against the force of the biasing spring, thereby uncovering the cutting edges of the routing tool so that they can come into cutting engagement with the material being routed.

In describing the invention in detail, reference will be made to the accompanying drawing in which:

FIGURE 1 is an exploded view showing the router and the various parts of the attachment of the present invention;

FIGURE 2 is a cross-sectional side view of a portion of the router showing the various parts of the router attachment of the present invention in assembled form;

FIGURE 3 is a view taken along the section lines 3—3 of FIGURE 2; and

FIGURES 4A and 4B are side views showing the manner of use of the router attachment of the present invention.

Referring to FIGURES 1 and 2, FIGURE 1 illustrates the portable router, comprising the casing 10 which houses the high-speed electric motor that rotates the cutting tool 11 and the base member 12 which has an annular bottom portion 13 of fairly substantial area so as to provide a stable base for the router in ordinary routing operation. Handles 14 project from the base member 12 to enable the operator to guide the router over the surface of the piece being routed. It is well known in the art to provide for a threading engagement between the casing 10 and the base member 12, using a fine pitch thread so that very fine adjustment of the depth of cut of the routing tool may readily be obtained.

The router attachment of the present invention comprises a member 15 which has an annular portion 16 that is adapted to fit against, and be screwed to the bottom portion 13 of the base member 12 of the router by means of machine screws 17. The member 15 also has a cylindrically-shaped portion 18 which extends upwardly within the annular open end of the member 12 when the member 15 is screwed into place as in FIGURE 2.

As shown in FIGURE 2, the cylindrical portion 18 is partially closed at its upper end by an end wall 19, but this end wall has an aperture therein which enables the routing tool or bit 20 to extend downwardly and protrude beyond the surface 13 of member 12. The end wall 19 provides a support for the helical spring 21. The cylindrical portion 18 of member 15 has elongate slots 22 in its side wall, and these slots receive pins 23 which are screwed into threaded openings provided in the side wall of piston 24. Piston 24 is of circular cross-section and has a diameter which enables it to slide readily within the cylindrical portion 18 of member 15. Piston 24 has a partially enclosed bottom end wall 25 against which an end of the spring 21 bears. A member 26 fits into the circular recesses formed in end wall 25 and is secured thereto by means of screws 27. The member 26 has a guide collar portion 26a that surrounds routing tool 20 when piston 24 and member 26 are moved upwardly into cylinder 18.

In the assembly of the router attachment of this invention, the spring 21 is placed in position within the cylindrical portion 18 of member 15 and the piston member 24 is then placed over the end of the spring, following which the spring 21 is compressed by pushing the piston upwardly into the cylindrical portion 18. When the spring has been fully compressed by pushing the piston 24 into the cylinder 18, the threaded openings in piston 24 which receive the pins 23 lie opposite the elongate apertures or slots 22 so that the pins 23 can now be inserted through such apertures 22 and screwed into the outer wall of the piston 24. With the member 26 in place, the bit 20 is normally fully protected by reason of the action of the spring 21 which urges the piston 24 away from the end wall 19 of cylinder 18, with such action being limited only by the restraining force of the pins 23 on the end of the elongate slots 22. It will be evident that the cutting edges of the bit 20 can only be exposed and thus be placed in engagement with the work to be routed by upward movement of the piston 24 within the cylinder 18 against the action of the spring 21.

FIGURE 4 illustrates one way in which the apparatus of this invention may be used in template routing. FIGURE 4A illustrates the router with the router attachment of the present invention affixed thereto and with the piston 24 fully extended so that the routing tool does not extend beyond the end of the guide collar 26. As shown, the template 30 is positioned above the material 32 to be routed and the template has a groove or other pattern formed therein at 31. FIGURE 4B shows the device after the router has been positioned on top of the template with the guide collar 26a inserted in the groove or pattern of the template and with the router pressed downwardly against the template 30 so that the piston 24 is retracted into the cylinder 18. This action forces the end of the cutting tool 20 out beyond the end of the guide collar 26a so that it can come into contact with and perform the required routing operation on the material 32. When the pressure of the router against the template is released, the tool 20 is immediately retracted into the guide collar 26a. Consequently, whenever the router is removed from the template, the router bit is fully protected prior to removal of the router from the surface of the template. Because of this, it becomes impossible for the router bit to come in contact with the edges of the template 30. It will of course be recognized that any pattern cut in the template must be sufficiently larger than the actual pattern desired to be cut by the routing tool to account for the radius of the guide collar 26a. For example, the template 30 may, as illustrated in FIGURE 1, provide for the cutting of a plurality of parallel slots in a strip of wood. Such parallel slots may be desired for the side rails of louvered doors, for example. Each of the slots 33 in the template 30 is dimensioned in both its length and width to exceed the corresponding dimensions of the desired slot in the material to be routed by the amount of the radius of the guide collar 26a.

In FIGURE 1, the cylinder 18 is shown as being essentially imperforate except for the slots 22 which receive pins 23. It is of course within the scope of the invention to have a plurality of slots or openings in the cylinder to permit wood chips, sawdust, etc. to be removed.

It is also within the scope of the invention to have the member 26, including guide collar 26a, formed integrally with end wall 25 of piston 24 rather than as a separate part in the manner shown in FIGURE 2.

Having described a router attachment for a portable router as one specific embodiment of my invention, I wish it to be understood that various modifications and alterations may be made to the specific form shown without departing from the scope of the invention.

What I claim is:

1. In combination with a portable routing tool having a planar base plate and cutting tool rotating about an axis perpendicular to said plate, an attachment to facilitate use of said tool in template routing comprising: first means comprising a first planar surface defining a central aperture and adapted to be secured to said planar base plate, second means comprising a second planar surface adapted to fit in said central aperture and a circular cylindrical boss projecting therefrom, said boss defining a tool receiving aperture extending therethrough and having a diameter at least equalling the diameter of the cylinder of revolution defined by said cutting tool, resilient support means for supporting said second means with said second planar surface parallel to said first planar surface and with said tool receiving aperture in axial alignment with the axis of said cutting tool, said resilient support means including means for resiliently urging said second means outwardly along the axis of said cutting tool and towards its tip to thereby move said circular boss to a position surrounding and protecting said cutting tool, whereby the exertion of force on said routing tool against a template when said boss is inserted in a pattern cut into said template forces said second means along the axis of said cutting tool against the action of said resilient support means until said second planar surface is co-planar with said first planar surface to thereby expose the end of said cutting tool and permit a routing operation without the possibility of contact between said cutting tool and said template.

2. The routing tool attachment of claim 1 in which said resilient support means includes a compression spring having one end fixed relative to the base plate of said cutting tool and its other end bearing against said second means.

3. The routing tool attachment of claim 2 in which said second means further includes a hollow piston-shaped member and said first means forms a hollow cylinder for receiving said piston-shaped member, said compression spring fitting within and bearing against the inner surfaces of said hollow cylinder and said piston-shaped member respectively.

4. The routing tool attachment of claim 3 wherein said hollow cylinder extends from the base plate of said routing tool in a direction away from the end of said cutting tool, said cylinder defining an aperture through its end wall to permit passage of said cutting tool therethrough, and means integral with said cylinder for supporting one end of said compression spring.

References Cited

UNITED STATES PATENTS

| 1,745,780 | 2/1930 | Casey | 144—134 |
| 1,899,883 | 2/1933 | Sacrey | 144—136 |

FOREIGN PATENTS

| 557,332 | 8/1932 | Germany. |

DONALD R. SCHRAN, *Primary Examiner.*